United States Patent
Michel et al.

(10) Patent No.: US 8,222,325 B2
(45) Date of Patent: *Jul. 17, 2012

(54) POLYVINYL ALCOHOL AS CO-STABILIZER FOR PVC

(75) Inventors: Samuel Michel, Hofheim A Ts (DE); Robert W. Fuss, Liederbach (DE); Masaki Kato, Okayama (JP); Masato Nakamae, Okayama (JP); Akira Tsuboi, Okayama (JP)

(73) Assignees: Kuraray Europe GmbH, Frankfurt am Main (DE); Kuraray Co., Ltd., Okayama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/669,537

(22) PCT Filed: Jul. 18, 2008

(86) PCT No.: PCT/EP2008/059436
§ 371 (c)(1), (2), (4) Date: Jan. 18, 2010

(87) PCT Pub. No.: WO2009/010579
PCT Pub. Date: Jan. 22, 2009

(65) Prior Publication Data
US 2010/0190890 A1    Jul. 29, 2010

(30) Foreign Application Priority Data
Jul. 19, 2007 (DE) .......................... 10 2007 033 970

(51) Int. Cl.
*B29C 47/00* (2006.01)

(52) U.S. Cl. ......... 524/13; 428/34.3; 524/357; 524/394; 524/398; 524/399; 524/400; 524/413; 524/423; 524/425; 524/439; 524/440; 524/447; 524/451; 524/494; 524/495; 524/503

(58) Field of Classification Search ................ 428/34.3; 524/13, 357, 394, 398, 399, 400, 413, 423, 524/425, 439, 440, 447, 451, 503, 494, 495
See application file for complete search history.

(56) References Cited

U.S. PATENT DOCUMENTS

| | | | |
|---|---|---|---|
| 4,123,400 A | | 10/1978 | Gay |
| 4,972,012 A | | 11/1990 | Amano et al. |
| 5,071,893 A | * | 12/1991 | Takida et al. ............... 524/114 |
| 5,118,741 A | | 6/1992 | Amano et al. |
| 5,143,959 A | | 9/1992 | Carette et al. |
| 5,159,013 A | * | 10/1992 | Takida et al. ................ 525/57 |
| 7,070,731 B2 | * | 7/2006 | Kato et al. .................. 264/349 |
| 2003/0183979 A1 | * | 10/2003 | Guntherberg et al. ... 264/211.21 |

FOREIGN PATENT DOCUMENTS

| | | |
|---|---|---|
| DE | 2728862 A1 | 1/1978 |
| EP | 1433794 A1 | 6/2004 |
| FR | 2116961 | 7/1972 |

OTHER PUBLICATIONS

Takeo Iida et al., "Synergetic Effects of Poly(vinyl alcohols) with Synergetic Metal Soap on the Stabilization of Poly(vinyl chloride)" Kobunshi Ronbunshu (Japanese Polymer Science and Technology), Society of Polymer Science, Tokyo, JP, vol. 47, No. 3, Mar. 1, 1990, pp. 197-205, XP000136037.

Ikeda et al., "Polymers and Polymer Composites", p. 649-662, vol. 11, No. 8, 2003.

\* cited by examiner

*Primary Examiner* — David W Wu
*Assistant Examiner* — Marie Reddick
(74) *Attorney, Agent, or Firm* — Brooks Kushman P.C.

(57) ABSTRACT

Thermoplastically processable PVC mixtures having enhanced stability are prepared by incorporating at least one stabilizer containing metal ions and a modified polyvinyl alcohol co-stabilizer.

14 Claims, No Drawings

POLYVINYL ALCOHOL AS CO-STABILIZER FOR PVC

CROSS-REFERENCE TO RELATED APPLICATIONS

This application is the U.S. national phase of PCT Appln. No. PCT/EP2008/059436 filed Jul. 18, 2008 which claims priority to German application DE 10 2007 033 970.6 filed Jul. 19, 2007.

BACKGROUND OF THE INVENTION

1. Field of the Invention

The present invention relates to thermoplastic processable mixtures based on polyvinyl chloride (PVC) which are stabilized with at least one metal ion in combination with modified polyvinyl alcohol.

2. Description of the Related Art

Thermoplastic processable mixtures based on PVC have to be stabilized against heat and/or UV-radiation in order to reduce chemical decomposition. Especially useful for this propose are metal ions, for example lead or tin salts or the more eco-friendly calcium or zinc compounds. The metal based stabilizers should have a good dispersibility within the polymer matrix without showing agglomeration or incompatibility during the thermoplastic processing of the PVC-mixture. Furthermore, the stabilizers should not migrate to the surface of the processed material in order to prevent so called "plate-out" or "fish eye" disturbances. Therefore, most stabilizers for PVC contain a plurality of components like polyols, beta diketones, phenolic compounds or inorganic stabilizers. See, for example U.S. Pat. No. 5,143,959.

The use of polyvinyl alcohol (PVA) in metal-based stabilizer mixtures for PVC is known. For example, U.S. Pat. No. 5,118,741 discloses the use of partially hydrolyzed PVA during suspension polymerization of PVC in an amount of 0.5 phr at most and the stabilisation of the thus obtained PVC-mixture with metal ions. A co-stabilizing effect of the PVA is not mentioned in this publication. Furthermore, the amounts of PVA added are too low to expect any co-stabilizing effect.

DE 272 8 862 discloses a mixture of PVC, and Ca/Zn salts of a β-diketone with PVA as a polyol compound without giving any details of the PVA used.

The thermal stability of PVC-mixtures containing PVA as co-stabilizer was further analysed by Ikeda et al. al. in "Polymers and Polymer Composites", p 649 to 662, vol. 11 no. 8, 2003. This paper shows that non-modified PVA is a suitable co-stabilizer for Zn-stabilized PVC mixtures.

The known non-modified PVA-containing stabilizer mixtures for PVC still have deficiencies in view of thermal stability and/or processability during the extrusion of PVC-mixtures.

SUMMARY OF THE INVENTION

Therefore, it was an object of the present invention to provide a modified polyvinyl alcohol improving the thermal stability of PVC-mixtures. Surprisingly it was found that modified, especially heat-treated polyvinyl alcohol is able to improve the thermal stability of PVC mixtures stabilized with metal ions and show sufficient compatibility with the polymer matrix.

DETAILED DESCRIPTION OF THE PREFERRED EMBODIMENTS

Therefore, one aspect of the invention is directed to thermoplastically processable mixtures based on polyvinyl chloride, containing a stabilizer comprising at least one metal ion and 0.1 to 15 parts per 100 parts of polyvinyl chloride of a polyvinyl alcohol whereas a 0.1-wt. % aqueous solution of the polyvinyl alcohol has a ratio (b)/(a) between the absorbance (a) at a wavelength of 280 nm and the absorbance (b) at a wavelength of 320 nm of more than 0.25 and the absorbance (a) is more than 0.1.

Preferably, the polyvinyl alcohol described above is obtained by heat treatment. Without being bound to any theory, it is assumed that during heat treatment, a cleavage of hydroxyl groups of the PVA occurs, resulting in multiple conjugated double bonds in the polymer backbone and the elimination of water molecules. The amount of conjugated double bonds can be measured by UV/VIS spectroscopy by the ratio of the absorption at 320 nm (b) to the absorption at 280 nm (a).

The ratio (b)/(a) between the absorbance (a) at a wavelength of 280 nm (a) and the absorbance (b) at a wavelength of 320 nm is preferably between 0.25 and 1, more preferably between 0.4 and 0.75.

The PVA used according to the invention has an absorbance (a) at wavelength of 280 nm of more than 0.1; preferably this absorption is more than 0.3 or more than 0.5. Absorbance (a) is preferably less than 1.5, more preferably less than 1.2.

The mixtures according to the invention preferably contain 0.1 to 5 parts polyvinyl alcohol per 100 parts PVC. Preferably 0.1 to 1 phr, preferably 0.1 to 0.5 phr.

The yellowness index (YI) of a 1-wt. % aqueous solution of the polyvinyl alcohol is 80 or lower, preferably 60 to 1 and more preferably 40 to 1. The YI (yellow index) is a value indicating the yellowness of a material and is expressed as a positive amount corresponding to the degree to which the hue departs from a transparent or white colour towards yellowish colour. A smaller value of YI means that the hue is closer to the transparent or white colour. The YI is measured as disclosed in the examples.

The saponification degree of the polyvinyl alcohol is preferably at least 60 mol %, more preferably 65 to 95 mol %, and most preferably 68 to 90 mol %. When the saponification degree of the polyvinyl alcohol is lower than 60 mol %, the vinyl alcohol polymer has a lower water-solubility and may thus have inferior handling properties.

The mean degree of polymerization of the polyvinyl alcohol is preferably 200 to 4000, more preferably 200 to 1000, and most preferably 200 to 770.

The PVA used in the invention can be modified or non-modified.

The method of producing the polyvinyl alcohol is not particularly limited. Generally, it is produced using a method comprising saponifying a vinyl ester polymer obtained by the polymerization of vinyl ester monomers. As the method of polymerizing vinyl ester monomers, such methods include solution polymerization, block polymerization, suspension polymerization, emulsion polymerization, etc.

Examples of the vinyl ester monomers include vinyl formiate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate, and vinyl benzoate. Among these, vinyl acetate is most preferable. When using vinyl acetate by itself, it is also possible to obtain a polyvinyl alcohol by polymerizing vinyl acetate to produce polyvinyl acetate and then saponifying the polyvinyl acetate.

Besides different vinyl ester monomers, other monomers may be copolymerized without parting from the scope of the present invention. The copolymerisation of vinyl esters, espe-} cially vinyl acetate may be conducted in the presence of chain-transfer agents like acetaldehyde, propyl aldehyde, n-butyl aldehyde, benzyl aldehyde and crotonic aldehyde.

The thusly obtained polyvinyl alcohol is then optionally heat-treated dat 90 to 180° C., preferably 95 to 170° C., and more preferably 100 to 160° C. When the heat treatment temperature exceeds 180° C., the vinyl alcohol polymer may be cross-linked through the heat treatment in some cases. The heat-treatment is performed for 0.5 to 20 hours, preferably 1 to 18 hours, and more preferably 1 to 16 hours.

The heat treatment may be conducted in an oxygen-containing atmosphere like air or in absence of air (i.e. oxygen), for example under a $CO_2$ or $N_2$ protective atmosphere. Suitable polyvinyl alcohols are disclosed in U.S. Pat. No. 7,070,731.

Before heat treatment, the PVA is colourless (white) and will change its colour to yellowish or even brown, probably due to conjugated double bonds. Since the PVA is used in the PVC matrix in a low amount, this colour does usually not affect the colour of the thermoplastic mixture.

Stabilizers according to the invention are at least one metal ion selected from the group barium, zinc, calcium or tin, especially in the form of the respective organic or inorganic salts. Preferable "metal soaps", i.e. salts of carbon acids comprising 1 to 25 carbon atoms, especially stearates, laurates, maleates, oleates, or terephthalates or metal salts of acetyl acetonate, mercaptane or β-diketones are used.

Especially useful is a stabilizer mixture derived from zinc and calcium salts, preferably salts of β-diketones, acetyl acetone or carboxylic acids comprising 1 to 25 carbon atoms, preferably in a mixture of 1:1 to 1:4, especially 1:2.

Furthermore, commonly used filling materials in PVC industry, for example those selected from the group consisting of $TiO_2$, $CaCO_3$, $ZrO_2$, Kaolin, Talcum, K/Al silicates, feldspar, silicate, barium sulphate, metal powder, graphite, calcium sulphate, ceramic and glass particles or wood may be added to the thermoplastic mixture in about 5 to 20 parts per hundred parts of polyvinyl chloride.

The addition of common plasticizers known to the PVC processing industry like dioctyl phthalate, diisononyl phthalate, or their hydrated derivates, dioctyl terephthalate, alkyladipates, alkybenzoates, epoxidised alkyl ester or epoxidised vegetable oils like epoxidised soybean or linseed oil, each in 0.1 to 100 parts per 100 parts PVC, is also possible.

In the case of plasticizers like epoxidised soybean oil which also contributes to the thermal stabilisation of the PVC, lower concentration may be employed and they will be added in amounts of about 0.01 to 10 phr of PVC.

Another object of the invention is a process for manufacture of thermoplastic processable mixtures based on polyvinyl chloride comprising at least one metal ion as stabilizer and 0.1 to 15 parts of a polyvinyl alcohol having a degree of polymerization of less than 700 and a degree of hydrolysis of 75 to 95 mol % per 100 parts of polyvinyl chloride by mixing the components at a temperature of at least 120° C., for example, in an extruder or a kneader. Preferably, the mixing may be performed prior to or during a thermoplastic form shaping process at about 180 to 240° C.

The optional thermoplastic form shaping process is usually performed with or in an extruder or calender, for example by first melting the components during the feeding process at the respective temperatures and afterwards form shaping the mixture at elevated pressure.

The PVA can be added to the PVC as a powder or in form of a solution. The PVA solution can be prepared with water or with any suitable organic solvent for example, methanol) or any mixture thereof. The metal salts can be added as a dry blend or also in form of a solution. Alternatively, all additives can be added alone or together (as a "one pack formulation") to the PVC as dry blend, for example in an extruder, dry mill or kneader. The use of the PVA as a co-stabilizer in thermoplastic processable mixtures based on PVC containing at least one metal ion as a stabilizer is further an object of the present invention.

Depending on the intended use of the thermoplastic mixture, different metal ions in different concentrations may be used. Typically, PVC mixtures for bottles, tubes or profiles may contain 0.3 to 3 phr tin ions. For flexible PVC mixtures like plastisols, Ba- and Zn-ions in a total amount of 1 to 3 phr are used. Ca/ZN mixtures in a total amount of 1-3.5 phr are used for floor coverings. Such mixtures and the amounts of metal ions are known in the PVC industry. In cases where epoxidised vegetable oils are employed it may even be possible to reduce the amount of PVA and metal ions according to the invention without impairing thermal stabilization.

Thermoplastic processable mixtures according to the invention are especially useful for the production of window or door profiles, films, coatings, sheets, tubes, cables, floorings, bottles, or floor coverings.

EXAMPLES

Samples comprising the components according to table 1 were prepared by the following steps:
1% of PVA was dissolved in water.
PVC was added to the solution, and then dried at 50° C. for 8 hrs
To the PVC/PVA mixture, DOP, Zn-st and Ca-st were added and dry blended
60 g of the resulting mixture was milled using an open roll at 160° C. for 5 min.

The obtained mixtures were pressed into sheets of 50×70 mm with a thickness of about 0.45 mm. The sheets were then heated to 180° C. in an oven and the whiteness of the heated sheets was measured at room temperature using a colorimeter. The whiteness values show the co-stabilizing effect of the polyvinyl alcohol used.

Whiteness Values

A differential colorimeter (Model SM-T-H1 colour computer, Suga Shikenki Co., Ltd) with SC-T(P),SM-T(P), ver8.00 software, mounting a specimen holder window 30 mm in diameter was used to measure the whiteness values.

Absorbance

A 0.1-wt. % aqueous solution of a vinyl alcohol polymer was prepared as a test portion. With respect to this test portion, absorbance at wavelengths of 280 nm and 320 nm was measured with the optical path length being 1 cm. A UV spectrophotometer (manufactured by Shimadzu Corporation; UV2100) was used for the measurement.

Example 1

Production of Vinyl Alcohol Polymer

A production example of a vinyl alcohol polymer is described below. First, 2400 g of vinyl acetate, 600 g of methanol, and 32.5 g of acetaldehyde were charged into a reactor vessel. Thereafter, the atmosphere inside the reactor vessel was replaced with nitrogen by bubbling of nitrogen gas. Next, the temperature of the reactor vessel was raised. When its internal temperature reached 60° C., 1.0 g of 2,2'-azobisisobutyronitrile was added into the reactor vessel and thereby polymerization was started. During the polymerization, the polymerization temperature was maintained at 60°

C. The container was cooled to stop the polymerization 4 hours after the start of the polymerization. At that point in time, the conversion was 50%. Subsequently, while methanol was added at intervals, unreacted vinyl acetate monomers were removed from the reacted solution under reduced pressure at 30° C. to obtain a methanol solution of polyvinyl acetate (with a concentration of 50%).

To a portion sampled from the methanol solution of polyvinyl acetate was added a methanol solution of sodium hydroxide whose concentration was 10% so that an alkali molar ratio (the mole ratio of an alkali compound to a vinyl acetate unit in the polyvinyl acetate) reached 0.5. This was left at 60° C. for five hours to allow saponification to proceed. After completion of the saponification, the Soxhlet extraction was conducted using methanol for three days and then drying was carried out under reduced pressure at 60° C. for three days. Thus, purified polyvinyl alcohol was obtained. The mean degree of polymerization of the polyvinyl alcohol was measured according to JIS K6726 and was 750.

To the above-mentioned methanol solution of polyvinyl acetate whose concentration was 50% were added water, methanol, methyl acetate, and a methanol solution of sodium hydroxide whose concentration was 10% so that the amounts of polyvinyl acetate, water, and methyl acetate were 40%, 1%, and 20%, respectively and the alkali molar ratio was 0.018. Thus, the polyvinyl acetate was saponified. Generated polyvinyl alcohol gel was milled and washed thoroughly with methanol and dried in a hot air dryer to give polyvinyl alcohol resin. Then its saponification degree was measured according to JIS K6726. The saponification degree was 72 mol %. This polyvinyl alcohol was heat-treated at 110° C. for 4 hours in air. Consequently, a vinyl alcohol polymer was obtained.

Example 2

Production of Vinyl Alcohol Polymer

Vinyl alcohol polymers were produced in the same manner as in Production Example 1 except that the polyvinyl-alcohol obtained was heat-treated at 130° C. for 6 hours in air.

Comparative Example 1

Production of Vinyl Alcohol Polymer

Vinyl alcohol polymers were produced in the same manner as in Production Example 1 except that no acetaldehyde was used in polymerization of vinyl acetate. The amounts of vinyl acetate and methanol were changed accordingly to adjust the degree of polymerization to 750.

Comparative Example 2

Production of Vinyl Alcohol Polymer

Vinyl alcohol polymers were produced in the same manner as in Production Example 1 except that the obtained polyvinyl alcohol was not heat-treated.

Result

As can be seen from table 2 modified polyvinyl alcohol according to the invention have an improved stabilizing effect as compared with polyvinyl alcohol known from prior art.

TABLE 1

| | |
|---|---|
| PVC (Shin-Etsu TK1000) | 100 phr |
| DOP | 20 phr |
| Zn stearate (Zn-st) | 2 phr |
| Ca stearate (Ca-st) | 1 phr |
| PVA (co-stabilizer) | 1 phr |

TABLE 2

| | | | | | | | Heating time [min] and whiteness level [%] | | | | | | |
|---|---|---|---|---|---|---|---|---|---|---|---|---|---|
| Example | a | b | b/a | YI | DP | DH | 0 | 60 | 90 | 105 | 120 | 136 | 150 |
| Ex. 1 | 0.63 | 0.19 | 0.30 | 7.4 | 750 | 72 | 92.6 | 86.2 | 84.1 | 81.4 | 76.1 | 64.7 | 0 |
| Ex. 2 | 0.60 | 0.39 | 0.65 | 87.5 | 750 | 72 | 90.2 | 70.6 | 63.9 | 57.7 | 20.3 | 0 | |
| Com. Ex. 1 | 0.034 | 0.14 | 0.41 | 3.5 | 750 | 72 | 92 | 83.1 | 66.2 | 20.8 | 0 | | |
| Com. Ex. 2 | 0.60 | 0.13 | 0.22 | 3.7 | 750 | 72 | 92.2 | 86.1 | 81.3 | 55.7 | 0 | | |

The invention claimed is:

1. A thermoplastically processable polyvinyl chloride composition comprising polyvinyl chloride and a stabilizer composition comprising at least one metal ion and 0.1 to 15 parts of a heat-treated polyvinyl alcohol per 100 parts of polyvinyl chloride, the heat-treated polyvinyl alcohol having an absorbance (a) at a wavelength of 280 nm and an absorbance (b) at a wavelength of 320 nm, the absorbance (a) being greater than 0.1 and the ratio (b)/(a) being greater than 0.25, the absorbances (a) and (b) measured in 0.1 weight percent aqueous solution, the thermoplastically processable polyvinyl chloride composition obtained by adding the heat treated polyvinyl alcohol to solid polyvinyl chloride.

2. The thermoplastically processable polyvinyl chloride composition of claim 1, wherein the heat-treated polyvinyl alcohol has a degree of polymerization of 200 to 4000.

3. The thermoplastically processable polyvinyl chloride composition of claim 2, wherein the heat-treated polyvinyl alcohol has a degree of hydrolysis of at least 60 Mol. %.

4. The thermoplastically processable polyvinyl chloride composition of claim 3, wherein a 1 weight percent aqueous solution of the heat-treated polyvinyl alcohol has a yellowness index (YI) of 80 or lower.

5. The thermoplastically processable polyvinyl chloride composition of claim 2, wherein a 1 weight percent aqueous solution of the heat-treated polyvinyl alcohol has a yellowness index (YI) of 80 or lower.

6. The thermoplastically processable polyvinyl chloride composition of claim 1, wherein the heat-treated polyvinyl alcohol has a degree of hydrolysis of at least 60 Mol. %.

7. The thermoplastically processable polyvinyl chloride composition of claim 6, wherein a 1 weight percent aqueous solution of the heat-treated polyvinyl alcohol has a yellowness index (YI) of 80 or lower.

8. The thermoplastically processable polyvinyl chloride composition of claim 1, wherein a 1 weight percent aqueous solution of the heat-treated polyvinyl alcohol has a yellowness index (YI) of 80 or lower.

9. The thermoplastically processable polyvinyl chloride composition of claim 1, wherein the at least one metal ion is selected from the group consisting of barium, zinc, calcium and tin.

10. The thermoplastically processable polyvinyl chloride composition of claim 1, wherein the at least one metal ion is present in the form of a mixture of zinc and calcium salts of at least one compound selected from the group consisting of carboxylic acid(s) comprising 1 to 25 carbon atoms, acetyl acetone, and β-diketones.

11. The thermoplastically processable polyvinyl chloride composition of claim 1, wherein the mixture contains 5 to 20 parts per 100 parts of polyvinyl chloride of at least one filler material.

12. The thermoplastically processable polyvinyl chloride composition of claim 11, wherein at least one filler material is selected from the group consisting of $TiO_2$, $CaCO_3$, $ZrO_2$, silicates, barium sulphate, metal powder, graphite, calcium sulphate, ceramic, glass particles, and wood.

13. The thermoplastically processable polyvinyl chloride composition of claim 11, wherein at least one filler material is selected from the group consisting of kaolin, talcum, and feldspar.

14. A window or door profile, film, coating, sheath, tube, bottle, or floor covering produced from a thermoplastically processable polyvinyl chloride composition of claim 1.

* * * * *